Sept. 13, 1960 A. F. RHODES ET AL 2,952,479
SEAL
Filed Dec. 31, 1953 4 Sheets-Sheet 2
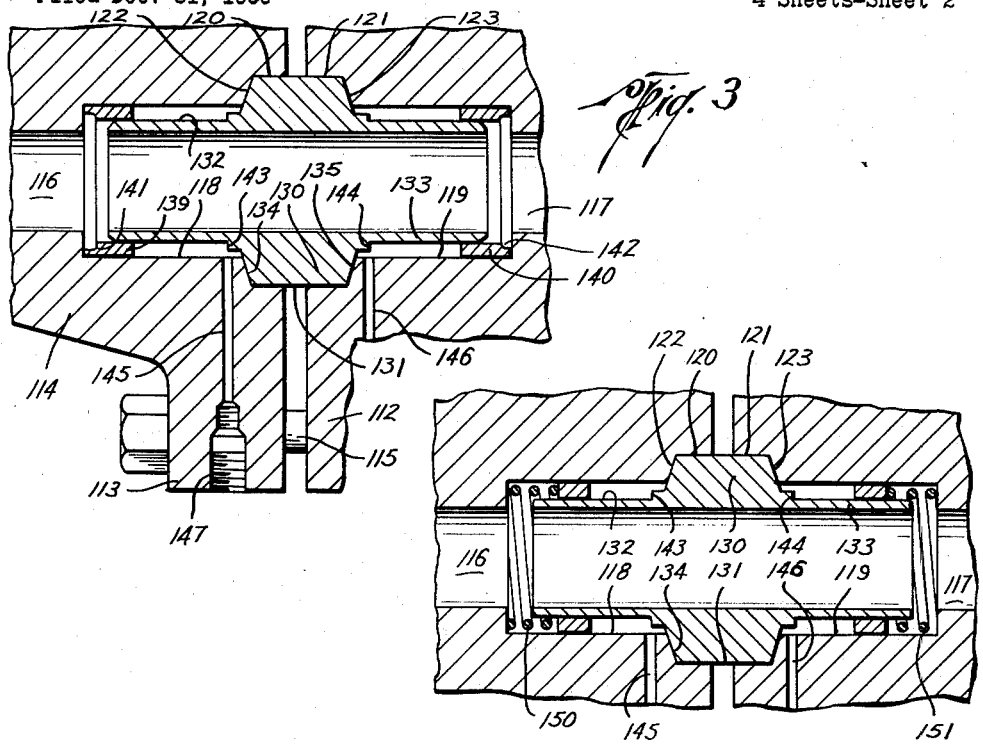
Fig. 3
Fig. 4
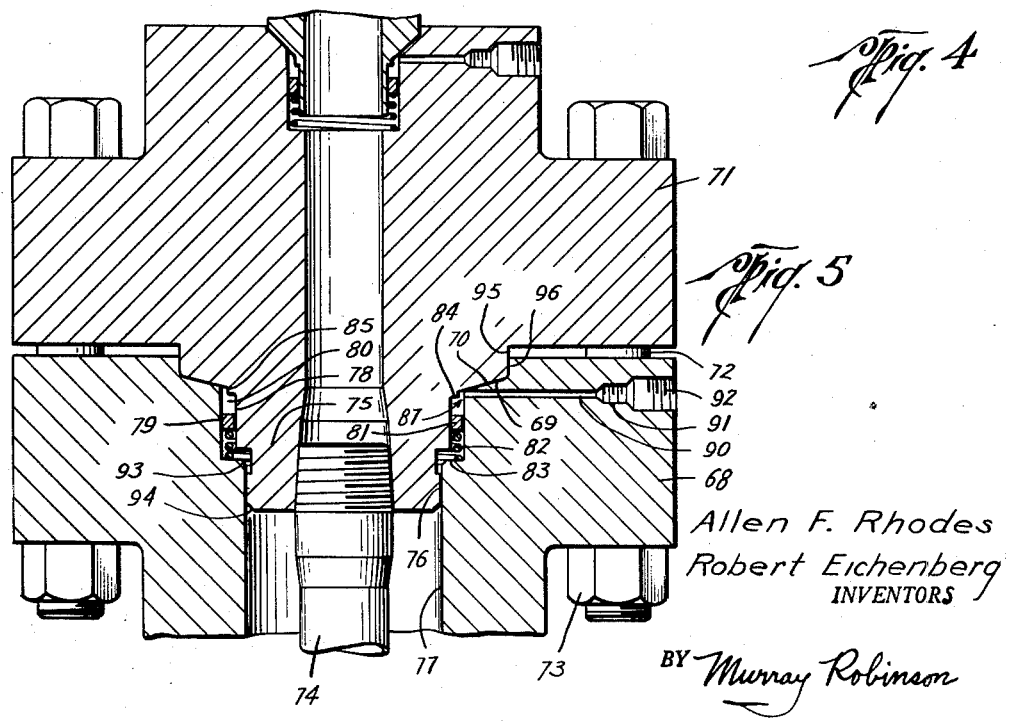
Fig. 5
Allen F. Rhodes
Robert Eichenberg
INVENTORS
BY Murray Robinson
ATTORNEY Allen F. Rhodes
Robert Eichenberg
INVENTORS BY Murray Robinson

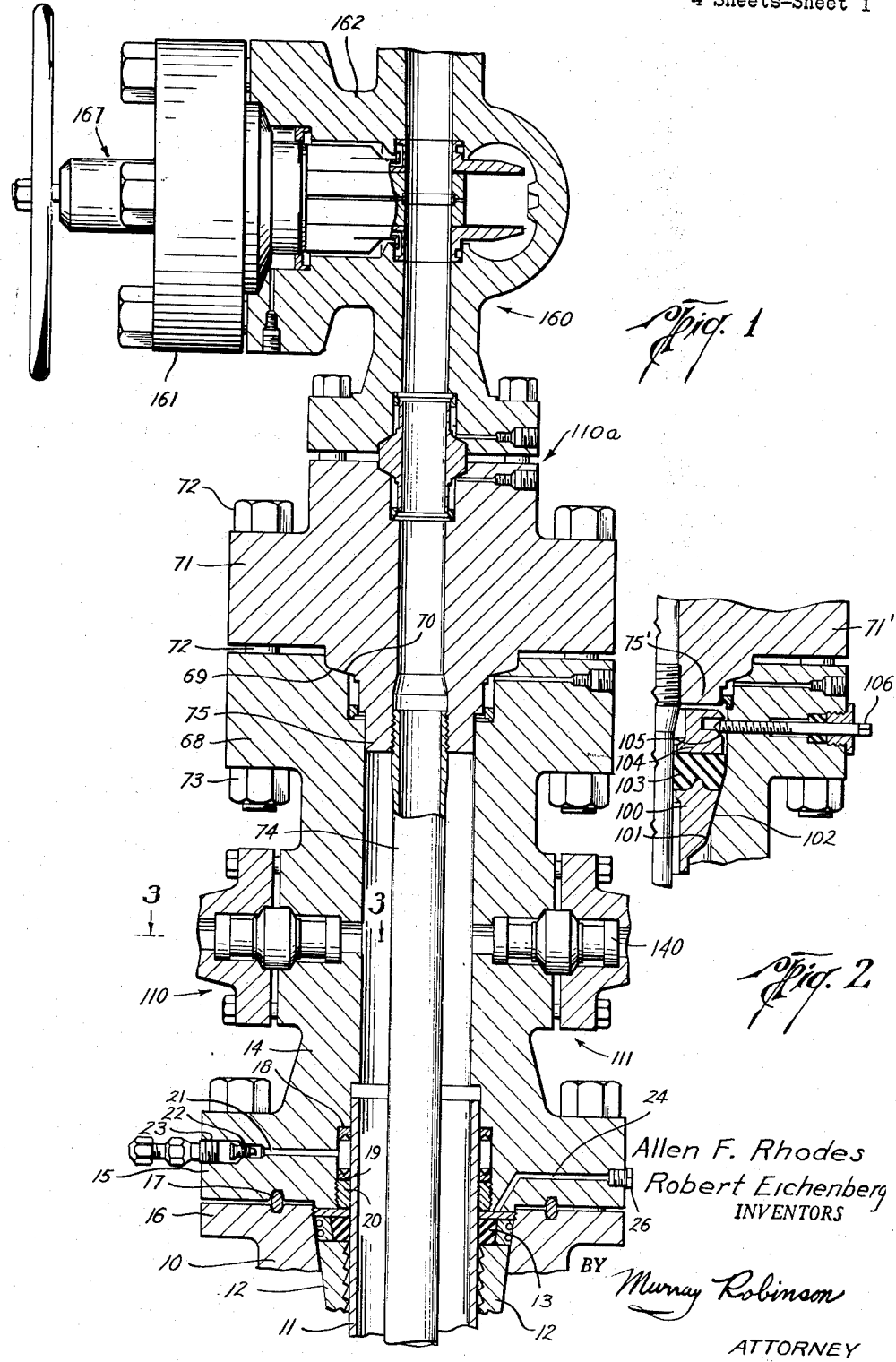

ATTORNEY

Sept. 13, 1960 A. F. RHODES ET AL 2,952,479
SEAL
Filed Dec. 31, 1953 4 Sheets-Sheet 4

Allen F. Rhodes
Robert Eichenberg
INVENTORS

BY Murray Robinson

ATTORNEY

United States Patent Office 2,952,479
Patented Sept. 13, 1960

2,952,479
SEAL

Allen F. Rhodes and Robert Eichenberg, Houston, Tex., assignors, by mesne assignments, to McEvoy Company, Houston, Tex., a corporation of Texas Filed Dec. 31, 1953, Ser. No. 401,484

12 Claims. (Cl. 285—10)

The use of plain metal to metal area contact seals in high pressure gas apparatus presents considerable difficulty because of the size of the metal parts required. It is not merely a matter of providing sufficient strength to withstand the pressure; it is necessary to provide parts and joining hardware large enough to stress the metal of the seal area to the yield point to cause it to flow and form a seal. It is an object of this invention to provide a satisfactory substitute for the plain metal to metal seal, particularly for use in oil well Christmas trees.

Another object of the invention is to provide a seal which can be repeatedly broken and made up again without losing its effectiveness.

A further object of the invention is to provide a seal which can be tightened or repaired while in use.

Other objects and advantages of the invention will become apparent from the following description of preferred embodiments thereof, reference being had to the accompanying drawings in which:

Figure 1 is a vertical section through the lower portion of a Christmas tree embodying the invention in the pipe connections to the annulus ports of the tubing head, in the connection to the tubing head of the tubing suspension flange, in the connection of the master valve to the tubing head, and in the connection of the valve bonnet to the body of the master valve;

Figure 2 is a fragmentary view similar to Figure 1 showing a modification of the connection to the tubing head of the tubing suspension flange;

Figure 3 is a horizontal section taken on line 3—3 of Figure 1, showing to a larger scale the connection between a pipe and the tubing head annulus ports;

Figure 4 is a view similar to Figure 3 showing a modification;

Figure 5 is an enlargement of a portion of Figure 1, showing the connection between the tubing suspension flange and the tubing head.

Figure 6:
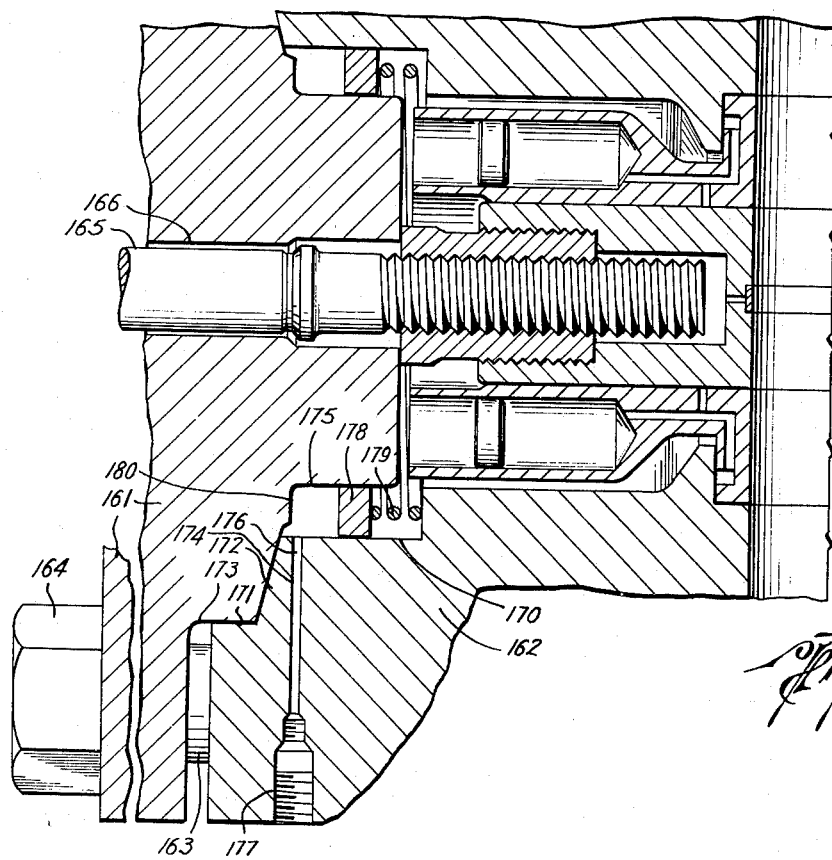
Figure 6 is a vertical section on a larger scale than Figure 1 showing the connection of the bonnet to the body of the master valve.

Referring now to Figure 1 there is shown the lower portion of a Christmas tree comprising a casing head 10 in which casing 11 is supported by means of slips 12. A packing device 13 seals between the casing and casing head. This type of casing suspension is shown in the 1951 edition of the Composite Catalog of Oil Field and Pipe Line Equipment at pages 3248, 3250, 3251, and 3256.

On top of the casing head is mounted tubing head 14. The lower flange 15 of the tubing head is bolted to the upper flange 16 of the casing head with a steel ring gasket 17 sealing therebetween. The upper end of the casing 11 extends into the lower portion of the tubing head where a secondary sealing means is provided comprising a pair of oppositely disposed lip rings 18 and 19 around the outside of the casing and held inside of the tubing head by a ring 20 screwed into the tubing head. Plastic sealing material, for example a mixture of polymerized castor oil, mica, and ground oat meal, is forced under pressure into the space between the lip rings through a channel 21. At the outer end of the channel 21 there is provided a double ball check valve 22 and a combination ball check valve and threaded connector 23 which form means to prevent outward flow of the sealing material and means to which a grease gun can be connected to introduce the plastic sealing material.

A passage 24 leads from the outer periphery of lower tubing head flange 15 to the space between primary seal 13 and the secondary lip ring seal 18—19. The end of passage 24 is normally closed by plug 26, but with the plug removed test fluid can be pumped into the space to see if it will hold pressure thereby testing the seals. If there are leaks, the space can be filled with plastic sealing material.

Figure 7:
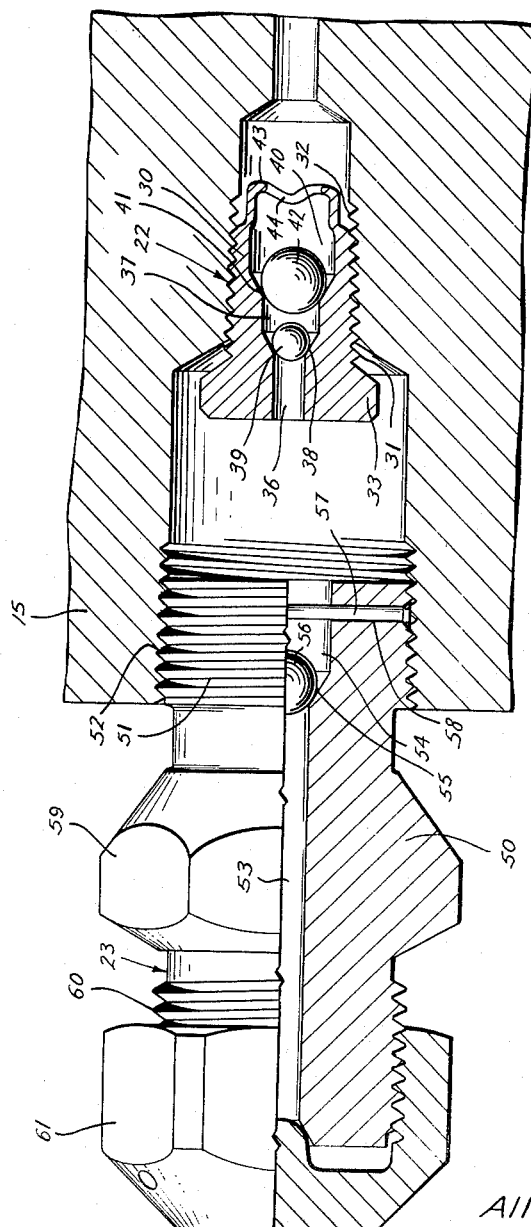
Figure 7 is a vertical section on a larger scale than Figure 1 showing a double ball check valve and Alemite fitting used in each of the connections.

Referring to Figure 7, the double ball check valve 22 comprises a generally cylindrical body 30 having a tapered threaded external surface 31 adapted to be screwed into a tapered threaded aperture 32 in the flange 15. The body 30 is provided with an enlarged hexagonal head 33 adapted to be turned by a socket wrench. There is an axial passage 36 through the valve having an enlarged portion 37 near its middle forming a conical shoulder 38 against which a ball 39 is adapted to seat. The passage is further enlarged at its inner end at 40 to form another conical shoulder 41 against which a larger ball 42 is adapted to seat. The valve body or plug 30 is crimped over at the end at 43 to retain the large ball in its passage 40 and the large ball in turn retains the small ball in passage 37. An indentation 44 in the crimped portion prevents the large ball from back sealing against the crimped portion.

The combination check valve and threaded connector 23 comprises a generally cylindrical body 50 having a threaded external surface 51 screwed into a threaded enlargement 52 of aperture 32. An axial passage 53 through body 50 terminates at its inner end in an enlarged portion 54 forming a conical shoulder 55 therebetween against which seats ball 56. A pin 57 driven through radial holes 58 retains the ball in passage 54. Near the middle of body 50 there is formed on the exterior thereof a wrench engageable hexagonal portion 59. At the other end of body 50 there is a threaded portion 60. A cap 61 is normally screwed over portion 60 to close the end of passage 53, but can easily be removed. With the cap removed a grease gun can be connected onto portion 60 to pump plastic sealing material through passages 53, 36, and 21 into a space to be filled. Any one of the three ball valves is sufficient to hold the pressure so that a triple safety factor is provided.

The above described connections are more or less conventional, since they are used in the relatively low pressure casing annulus system. It is only in connections forming part of the system exposed to the higher tubing pressure that the present invention is shown.

Referring again to Figure 1, the upper tubing head flange 68 is provided with a conical seating portion 69 in which rests the conical seating portion 70 of tubing suspension flange 71. The tubing suspension flange is secured to the upper tubing head flange by a plurality of bolts such as 72 and nuts such as 73, the bolts being peripherally spaced apart disposed in a circle around the flanges. Tubing 74 is screwed into a nipple or cuff 75 extending downwardly from the center of the tubing suspension flange into the upper part of the tubing head.

Referring now to Figure 5, the lowermost end 76 of cuff 75 fits snugly within the main passage 77 of the tubing head. An enlarged portion 78 of the cuff is radially spaced from counterbore 79 in the upper end of the tubing head just below seat 69, forming an annular chamber 80. An annular piston or barrier ring 81 fits closely within the chamber 80 but has enough clearance between its cylindrical inner and outer walls and the adjacent walls of the cuff and counterbore to allow it to slide axially up and down in chamber 80. Piston 81 is preferably made of metal.

Beneath the piston 81 is a helical compression spring 82 bearing at its lower end on shoulder 83 formed between passage 77 and counterbore 79. Spring 82 is of such length as to urge piston 81 all the way to the limit of its upward motion against annular stop shoulder 84 formed between enlarged portion 78 of the cuff and a further enlarged portion 85 thereof. The diameter of enlarged portion 85, though greater than the diameter of portion 78, is smaller than that of counterbore 79, leaving an annular space 87 therebetween.

A radial passage 90 through flange 68 communicates at its inner end with space 87 and chamber 80. The outer end of passage 90 is provided with an enlarged threaded bore 91 and a threaded counterbore 92 to receive respectively a double ball check valve and a combination ball check valve and grease gun connector the same as shown in Figure 7. Passage 90 may be duplicated at other points around the periphery of the flange 68.

In making up the connection between the tubing suspension flange 71 and the upper tubing head flange 68, the lower end 76 of the cuff 75 will be inserted into passage 77. A bevel 93 on the inner edge of shoulder 83 and a bevel 94 on the end of the cuff facilitate this operation. The spring 82 and piston 81 will have already been placed in the tubing head in counterbore 79. Once the cuff 75 is in passage 77 it serves as a pilot to maintain concentricity of the parts as the flanges 71 and 68 are brought together. A cylindrical neck 95 on the flange 71 will enter a cylindrical counterbore 96 at the upper surface of flange 68 to assist in the piloting of the connection prior to engagement of seating surfaces 69 and 70. This piloting of the parts together is important since there will be the heavy weight of a long string of tubing 74 on the tubing flange which means that any bumping together of surfaces 69 and 70 when not in perfect alignment would cause them to be dented or flattened. Since these surfaces not only support the weight of the tubing but form the seal between the flanges it is important that they not be marred.

After the tubing suspension flange is seated in the tubing head, the bolts 72 are inserted and the nuts 73 tightened thereon. A greater tension is put in the bolts than the load to which they would be subjected if the tubing pressure were to leak into the casing annulus. This insures that the sealing surfaces 69 and 70 will remain in contact at all times. The contacting area of surfaces 69 and 70, however, is large enough so that under such bolt tension there will be no galling of the surfaces, that is, they will not be stressed beyond the yield point. This makes it possible to break the connection and make it up again effectively, since surfaces 69 and 70 are not injured when the connection is made up. Suitable leeway and factor of safety will be provided by prestressing the bolts in make up to 125% of the maximum internal pressure load that might be encountered, and providing sufficient area of contact over surfaces 69 and 70 to keep the load down to about 80% of the yield point load. It may be noted that the taper of surfaces 69 and 70 increases their area for a given diameter as well as facilitating their engagement.

After the flanges 68 and 71 have been bolted together, plastic sealing material similar to that used in the seal at the lower tubing head flange is pumped into the chambers 87 and 80, forcing the piston down against spring 82. The chamber 87 insures that the end of passage 90 through which the sealing material is admitted will not be blocked off when the piston is at its upper limit position. When the chambers are filled further pressure on the sealing material will cause some of it to enter the minute passages formed between surfaces 69 and 70 and form a seal therebetween.

It is to be noted that although the seal between the tubing suspension flange and the upper flange of the tubing head is normally subjected only to casing annulus pressure, it must be capable of withstanding tubing pressure in case of a leak from the tubing into the casing annulus in order that the tubing head may provide emergency pressure control. Similar high pressure seals are not used between the casing and the tubing head and casing head because the casing will not withstand the tubing pressure so there would be leaks at this point regardless of the nature of the seals.

In the event of a leak subjecting the casing annulus to tubing pressure the underside of barrier 81 (Figure 5) would be acted on by such pressure and would transmit the pressure to the plastic sealing material forcing it farther into the small spaces between metal surfaces 69 and 70 until sufficient resistance to flow is created to prevent further flow. An automatic seal is thus achieved.

Referring to Figure 2, there is shown a slightly modified form of tubing suspension employing a conventional wrap-around seal between the tubing and tubing head just below the tubing suspension flange. The wrap-around seal comprises a body 100 having tapered outer surface 101 to engage the conical slip bowl 102. Packing 103 on top of the body 100 is compressed by a follower ring 104 which has a tapered outer surface 105 which is engaged by lock screws 106 to compress the packing. The body, packer, and ring are held together by vertical through bolts and the whole assembly is split vertically into two halves which are hinged together and provided with automatic latches so that the seal can be snapped around the tubing quickly, but none of these details are shown since they are conventional. For a fuller description see the 1952 Composite Catalogue of Oil Field and Pipe Line Equipment at page 3262. The tubing suspension flange 71 is the same as that shown in Figure 1 except that the threaded cuff 75' is shorter in order to leave room for the seal.

Referring again to Figure 1, at each side of the tubing head there are ports which are connected by high pressure connections 110, 111 to pipes (not shown) through which fluid can be introduced or withdrawn from the casing annulus. Connection 110 is better shown in Figure 3. It comprises flange 112 on the tubing head and a flange 113 on the end of a pipe nipple 114. The flanges are held together by bolts such as 115. The flow passages 116, 117 through the flanges are counterbored at 118 and 119, and the mouths of the counterbores are further enlarged at 120, 121, with conical shoulders 122, 123 formed at the junctures of the smaller and larger diameter portions of the counterbores.

Disposed between the two flanges in the space between the counterbores is a compression nipple 130 having a large diameter central portion 131 adapted to fit snugly within the mouths of the flanges. The ends 132, 133 of the nipple are of smaller diameter than the counterbores 118, 119 leaving annular spaces therebetween. The shoulders 134, 135 between the central and end portions of the nipple are conical and of the same taper as the conical portions of the flanges so as to seat therein. The central portion of the nipple is longer than the combined depths of the mouths of the flanges so that it keeps the flanges separated. The tension on bolts 115 is sufficient to hold the conical surfaces of the nipple and flanges together even if full tubing pressure is admitted to the casing annulus, yet not sufficient to stress the conical surfaces to the yield point, so that there is no galling thereof.

In the annular spaces around each end of the nipple are disposed slidable barriers 139, 140, similar to barrier 81 (Figure 5). The end of each barrier farthest from the flange mouths is rabbeted as shown at 141, 142 so as to prevent the end from sealing against the bottom of the counterbore. Shoulders 143, 144 of diameter greater than that of the small diameter or neck portions of the compression nipple but of smaller diameter than the counterbores 118, 119 prevent the barriers from sealing off passages 145, 146. Passages 145, 146, lead from the outer peripheries of the flanges into the annular spaces opposite the shoulders 143, 144. The outer ends of these ports are enlarged as shown at 147 to receive check valves and connectors the same as 22, 23 shown in Figures 1 and 7.

Plastic sealing material is introduced into the two annular spaces around the ends of the compression nipple through the passages 145, 146. Any pressure in the flow passages 116, 117 will act against the barriers 140, 141, to put pressure on the plastic sealing material and force it into the minute openings between the conical seating surfaces of the compression nipple and flanges to form a seal therebetween. The operation is thus the same as that of the seal in the connection of the tubing suspension flange to the tubing head, considering that the compression nipple sealed to the pipe nipple flange takes the place of the integral cuff on the tubing suspension flange. The choice between the symmetrical separate compression nipple construction of Figure 4 and the integral cuff construction of Figure 5 depends on factors such as ease of machining, cost, and number of parts.

Figure 4 shows a modification of the Figure 3 construction in which helical springs 150, 151, are used, similar to spring 82 of the Figure 5 construction. These springs insure that no air or fluid is trapped in the space to be filled with sealing material.

Referring again to Figure 1, the master valve 160 is connected to the top of the tubing suspension flange by a high pressure connection 110a that is in all respects the same as connections 110, 111, shown in Figure 3, and may likewise be modified to the Figure 4 construction.

Master valve 160 is shown as a non-rising stem gate valve of the automatic plastic sealed type, such as that described more fully in United States Patent 2,433,638, issued September 22, 1944, to Alexander S. Volpin. The connection between the valve bonnet 161 and body 162 of the master valve, however, is of a novel type incorporating the present invention heretofore disclosed for use in the tubing head-tubing suspension flange connection and in connections 110, 111, and 161, and is best shown in Figure 6. As distinguished from the automatic seal of the gate valve 160, all of the connections embodying the present invention are between members which tend to be forced apart by the pressure sealed against. In other words, the effective area of said members exposed to said pressure acting in a direction tending to separate or open the connection between the members is greater than the effective area thereof exposed to said pressure acting in a direction tending to close the connection.

Referring now to Figure 6, the valve bonnet 161 is secured to the valve body 162 by means of a plurality of stud bolts and nuts, such as those shown at 163, 164, disposed circumferentially about the valve stem 165 which passes through passage 166 in bonnet 161 and is sealed thereto by a suitable packing gland (not shown in Figure 6 but indicated at 167 in Figure 1). The valve body is provided with an inner smaller diameter counterbore 170 and an outer larger diameter mouth 171 between which is formed a conical seat 172. The valve bonnet has a large diameter extension 173 which fits snugly within mouth 171, a conical shoulder 174 which has the same taper as seat 172 and is adapted to seat thereon, and a neck 175 of smaller diameter than counterbore 170 forming an annular space therebetween. A passage 176 extends radially from the annular space to the outside of the valve body, and terminates in an enlarged threaded opening 177 which is adapted to receive a check valve and connection such as 22, 23, shown in Figures 1 and 7. A barrier ring 178 is slidably disposed in the annular space and is biased toward the bonnet by helical spring 179. Annular shoulder 180 prevents the barrier from blocking the end of passage 176. The annular space is filled with plastic sealing material through passage 176. As in the other embodiments the tension in the bolts holding the bonnet to the body is made sufficient to hold the conical shoulder 174 on conical seat 172 against the maximum pressure expected to be encountered, but not sufficient to stress the conical surfaces to the yield point, so that there is no galling. Pressure of fluid inside the valve body acts against the barrier 178 to force the plastic sealing material into the small spaces between the sealing surfaces to provide a seal that is gas tight as well as liquid tight, as are the other high pressure connections embodying the invention.

The connection of the master valve to the upper Christmas tree manifold and the wing valves, chokes, T's and other fittings on the tree that may be exposed to high pressure can be high pressure connections similar to those described above.

It will be noted that in all cases there is provided means forming a plastic sealing material receiving chamber over the high pressure end of the joint between two walls. In each of the illustrated examples, the chamber is an annular space between a bell at the end of one annular wall and a spigot at the end of another. In Figure 5 there is the chamber 87 between the bell formed by counterbore 79 in the tubing head wall and the spigot formed by cuff 75 on the wall formed by the tubing suspension flange. In Figure 3 there are the annular chambers between the bells formed by counterbores 118, 119 in the walls of the tubing head and pipe nipple and the spigots formed by the ends 132, 133 of the wall formed by nipple 130. In Figure 6 there is the annular chamber formed between the bell formed by the counterbore 170 in the wall formed by the valve body and the spigot formed by the neck 175 on the wall formed by the valve bonnet. However, the invention, as set forth in the claims, need not be limited in its application solely to bell and spigot type ends on annular members such as fluid conduits and tubing hangers, and valve bonnets.

It is further to be noted that in all cases the pressure being sealed against tends to open the joint. In Figure 5, the pressure in the tubing head acts on the lower end cuff 75, tending to separate the joint 69—70. In Figure 6, the pressure in the valve body acts on the inner face of the valve bonnet, tending to separate the joint 172—174, and the pressure acting against the inside of the valve body is balanced except for the pressure on the bottom of the valve, i.e. the part opposite from the bonnet, so that the net pressure on the valve body tends to separate the joint 172—174. In Figure 3, the pressure in the tubing head and pipe nipple acting against the ends of counterbores 118 and 119 tend to separate the joints at 123—135 and 122—134.

While several preferred embodiments of the invention have been shown and described, it is obvious that many modifications thereof can be made by one skilled in the art without departing from the spirit thereof, and it is desired to protect by Letters Patent all forms of the invention falling within the scope of the following claims.

We claim:

1. In combination, a tubular member, a cylindrical member disposed inside and concentric with and radially spaced from said tubular member forming an annular space therebetween, an annular member held to said cylindrical member extending radially outward from said cylindrical member across said space to close one end thereof and engaging said tubular member along an annular surface transverse to the axis of said tubular member, means to rigidly clamp said annular member into engagement with said tubular member, plastic sealing material in said space and immediately adjacent to the juncture of said annular member and tubular member, and means slidably engaging said tubular member and cylindrical member and openly exposed to the other end of said space to prevent fluid entering said space from the other end thereof from channeling through said sealing material.

2. An automatic flange seal comprising a pair of flanges each having an annular seating surface, means to hold said flanges in coaxial alignment with said seating surfaces in engagement with each other and means to automatically feed plastic sealing material to said seating surfaces to form a seal therebetween comprising a neck on one of said flanges concentric with and radially spaced inside of an opening in the other of said flanges to form an annular space in communication with said seating surfaces, and means movable with respect to both said flanges responsive to differential pressures across said engaged flange seating surfaces which tend to separate said flanges for placing said sealing material under differential pressure.

3. In combination, a first fluid conduit, a second fluid conduit, the axes of said conduits being aligned at the adjacent parts thereof, means for holding said parts together, a spigot extending axially from said part of one of said conduits, a bell on said part of the other one of said conduits, said spigot extending into said bell and being spaced radially inwardly from said bell over a portion of the length thereof near the end of said spigot to form a chamber therebetween, an adjacent portion of said spigot farther from the end thereof having a tapered portion flaring away from said end of the spigot and said bell having a tapered portion correlative to said tapered portion of the spigot and in engagement therewith, an annular piston slidably disposed in said chamber in sliding engagement with each of said bell and said spigot closing the space between the bell and spigot, and plastic sealing material disposed in said space immediately adjacent the juncture of said tapered portions.

4. In combination, a first fluid conduit, a second fluid conduit, the axes of said conduits being aligned at the adjacent parts thereof, means for holding said parts together, a spigot extending axially from said part of one of said conduits into a bell on said part of the other one of said conduits, said spigot being spaced radially inwardly from said bell over a portion of the length thereof near the end of said spigot, to form a chamber therebetween, an adjacent portion of said spigot farther from the end thereof having a tapered portion flaring away from said end of the spigot and said bell having a tapered portion correlative to said tapered portion of the spigot and in engagement therewith, another portion of said spigot on the opposite side of said tapered portion from the first mentioned portion thereof being cylindrical and the adjacent portion of said bell being cylindrical and fitting closely therearound, an annular piston in said chamber around said spigot closing the space between the bell and spigot, means limiting motion of said piston toward said engagement whereby said chamber cannot be reduced to zero space adjacent said engagement, and plastic sealing material disposed in said space immediately adjacent the juncture of said tapered portions.

5. In combination, a pair of fluid conduits, each conduit having an outturned flange at the end thereof, means to hold said flanges together, a counterbore in the end of each conduit, a seat at the bottom of each counterbore, a nipple having an outer diameter at its center portion fitting closely within said counterbores, said nipple having a seat portion on each side of said center portion in engagement with one of said seats, said nipple having an extension at each end beyond said seat portion extending into the adjacent conduit and spaced radially inwardly therefrom leaving a free passage around each extension end, an annular barrier around each extension bridging the space between said extension and the adjacent conduit and slidable therein, and means including a passage through each conduit from the exterior thereof into said space to introduce plastic sealing material into said space immediately adjacent the juncture of the seat and seat portion.

6. In combination, a pair of fluid conduits, each conduit having an outturned flange at the end thereof, means to hold said flanges together, a counterbore in the end of each conduit, a tapered seat at the bottom of each counterbore flaring toward the end of the conduit, a nipple having an outer diameter at its center portion fitting closely within said counterbores, said nipple having a tapered portion on each side of said center portion having a taper the same as that of said seats and in engagement therewith, said nipple having an extension at each end beyond said tapered portion extending into the adjacent conduit and spaced radially inwardly therefrom, an annular barrier around each extension bridging the space between said extension and the adjacent conduit and slidable therein, and means including a passage through each conduit from the exterior thereof into said space to introduce plastic sealing material into said space immediately adjacent the juncture of the seat and seat portion.

7. In combination, a pair of fluid conduits, each conduit having an outturned flange at the end thereof, means to hold said flanges together, a counterbore in the end of each conduit, a seat at the bottom of each counterbore flaring toward the end of the conduit, a nipple having an outer diameter at its center portion fitting closely within said counterbores, said nipple having a seat portion on each side of said center portion in engagement with one of said seats, each of said conduits having a second and smaller counterbore on the side of said seat farthest from the end of the conduit, said nipple having an extension at each end thereof beyond said seat portion thereof extending into said second counterbore of the adjacent conduit and spaced radially inwardly therefrom and stopping short of the end of said second counterbore, an annular barrier around each extension bridging the space between said extension and said second counterbore of the adjacent conduit and slidable therein, each of said barriers having means on the face thereof farthest from the end of the adjacent conduit to prevent said face from sealing against said end of the second counterbore of the adjacent coupling, and means to supply plastic sealing material into each of said spaces between the barrier and the seats immediately adjacent the juncture of the seat and seat portion.

8. In combination, a pair of fluid conduits, each conduit having an outturned flange at the end thereof, means to hold said flanges together, a counterbore in the end of each conduit, a tapered seat at the bottom of each counterbore flaring toward the end of the conduit, a nipple having an outer diameter at its center portion fitting closely within said counterbores, said nipple having a tapered portion on each side of said center portion having a taper the same as that of said seats and in engagement therewith, each of said conduits having a second and smaller counterbore on the side of said seat farthest from the end of the conduit, said nipple having an extension at each end thereof beyond said tapered portion thereof extending into said second counterbore of the adjacent conduit and spaced radially inwardly therefrom and stopping short of the end of said second counterbore, an annular means around each extension forming a barrier to the passage of plastic sealing material, said means bridging the space between said extension and said second counterbore of the adjacent conduit and slidable therein, each of said barrier means having means on the face thereof farthest from the end of the adjacent conduit to prevent said face from sealing against said end of the second counterbore of the adjacent coupling, and means to supply plastic sealing material into each of said spaces between the barrier means and the juncture of said tapered portion and tapered seat.

9. A tubing suspension comprising a tubing head having a vertical passage therethrough and annular flanges at its upper and lower ends, the upper end of said head having a counterbore and a conical seat between said counterbore and passage, an adapter flange mounted on said head, said flange having a vertical passage therethrough, an extension on the lower face of said flange coaxial with the last said passage, said extension having a cylindrical surface fitting in said counterbore and a conical surface resting on said seat and a cylindrical end extending down the first said passage and spaced radially therefrom to form an annular space, a tubing within said head screwed at its upper end into said extension, an annular barrier ring in said annular space mounted for reciprocation coaxially with said extension, a radial passage through the upper flange of said head communicating with said annular space, a check valve in the last said passage preventing outflow of fluid therethrough, plastic sealing material in said annular space in contact with the juncture of said conical surface and said seat, and bolts holding said adapter flange to the upper flange of said head.

10. In combination, first means forming a first wall, second means forming a second wall, an area of said first means surrounding a portion thereof, an area of said second means surrounding a portion thereof, said first and second means areas being in contact forming a joint therebetween, said first and second means being adapted to separate a first fluid at a higher pressure on one side thereof from a second fluid at a lower pressure on the other side thereof, the effective areas of said first and second means exposed on said one side thereof to fluid pressure acting in a direction tending to open said joint being larger than the effective areas of said first and second means exposed on said one side thereof to fluid pressure acting in a direction tending to close said joint, means to hold said first and second means areas in contact and to prevent relative motion thereof, piston means at said one side of said first and second means adjacent to but spaced from said joint and in sliding contact with each of said first and second means forming a chamber adjacent said joint and having one side thereof exposed to pressures at said one side of said first and second means, and plastic sealing material in said chamber in contact with said joint, said sealing material being pressured to tend to enter and seal said joint by pressures at said one side of said first and second means acting on said piston means.

11. The combination of claim 10, including means for biasing said piston means toward said joint, spacing means for limiting the extent of movement of said piston means toward said joint to maintain said spacing therebetween, and valved port means through one of said first or second means from said other side thereof to said spacing for flowing said sealing material into said chamber.

12. A tubing suspension, comprising a tubing head having a vertical passage therethrough of generally circular horizontal cross section and having an annular seat around the upper end of said passage, a hanger having an annular seat therearound seated upon said tubing head seat and extending into said passage with an annular space therearound, a vertical floway through said hanger, tubing connection means at the lower end of said hanger for connection of a tubing having fluid flow communication with said floway, a barrier disposed in said annular space in sliding contact with said hanger and the side of said passage, said annular space being freely open at its lower end to be in free communication with said passage therebelow, means holding said hanger and tubing head seats firmly together, said annular space having a portion above said barrier into which said barrier cannot be moved, and valved port means through said tubing head from the exterior thereof to said annular space portion for introduction of plastic sealant material into said annular space above said barrier, whereby fluid pressure against the lower side of said barrier from said passage therebelow urges said barrier to compress plastic sealant material above said barrier to between said held-together seats.

References Cited in the file of this patent

UNITED STATES PATENTS

| | | |
|---|---|---|
| 696,106 | Osborne | Mar. 25, 1902 |
| 1,572,922 | Govers | Feb. 16, 1926 |
| 2,065,726 | Nordstrom | Dec. 29, 1936 |
| 2,097,943 | Zagorski | Nov. 2, 1937 |
| 2,122,071 | Rasmussen | June 28, 1938 |
| 2,278,721 | Jones | Apr. 7, 1942 |
| 2,444,868 | Allen | July 6, 1948 |
| 2,491,599 | Allen | Dec. 20, 1949 |
| 2,536,898 | Works | Jan. 2, 1951 |
| 2,562,003 | Tratzik | July 24, 1951 |
| 2,605,993 | Bowan | Aug. 5, 1952 |
| 2,704,579 | Brown | Mar. 22, 1955 |